(12) United States Patent
Jeong et al.

(10) Patent No.: US 12,304,976 B2
(45) Date of Patent: May 20, 2025

(54) POLYETHYLENE AND CHLORINATED POLYETHYLENE THEREOF

(71) Applicant: LG Chem, Ltd., Seoul (KR)

(72) Inventors: Cheolhwan Jeong, Daejeon (KR); Si Jung Lee, Daejeon (KR); Bog Ki Hong, Daejeon (KR); Sunghyun Park, Daejeon (KR); Sun Mi Kim, Daejeon (KR); Yi Young Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1204 days.

(21) Appl. No.: 17/051,031

(22) PCT Filed: Dec. 10, 2019

(86) PCT No.: PCT/KR2019/017398
§ 371 (c)(1),
(2) Date: Oct. 27, 2020

(87) PCT Pub. No.: WO2020/122561
PCT Pub. Date: Jun. 18, 2020

(65) Prior Publication Data
US 2021/0047443 A1    Feb. 18, 2021

(30) Foreign Application Priority Data

| Dec. 10, 2018 | (KR) | 10-2018-0158328 |
| Jan. 18, 2019 | (KR) | 10-2019-0007089 |
| Dec. 9, 2019  | (KR) | 10-2019-0163116 |

(51) Int. Cl.
*C08F 110/02* (2006.01)

(52) U.S. Cl.
CPC ........ *C08F 110/02* (2013.01); *C08F 2420/01* (2013.01); *C08F 2810/00* (2013.01)

(58) Field of Classification Search
CPC ........ C08F 110/02; C08F 10/00; C08F 10/02; C08F 110/00; C08L 23/04; C08L 23/06
See application file for complete search history.

(56) References Cited

U.S. PATENT DOCUMENTS

| 4,825,939 | A  | * | 5/1989  | Salyer ............... F28D 20/023 165/53 |
| 5,798,427 | A  |   | 8/1998  | Foster et al. |
| 5,914,289 | A  |   | 6/1999  | Razavi |
| 6,124,406 | A  |   | 9/2000  | Cinadr et al. |
| 6,689,440 | B2 | * | 2/2004  | Hsich ............... F16L 58/109 138/146 |
| 6,870,010 | B1 | * | 3/2005  | Lue ............... C08L 23/0815 526/348 |
| 7,345,113 | B2 |   | 3/2008  | Van Dun et al. |
| 8,476,370 | B2 |   | 7/2013  | Backman et al. |
| 8,920,891 | B2 |   | 12/2014 | Michie, Jr. et al. |
| 9,234,061 | B2 |   | 1/2016  | Vahteri et al. |
| 9,492,963 | B2 |   | 11/2016 | Michie, Jr. et al. |
| 9,714,305 | B2 |   | 7/2017  | Wagner et al. |
| 10,544,247 | B2 |  | 1/2020  | Kim et al. |
| 10,618,989 | B2 |  | 4/2020  | Doufas et al. |
| 10,774,163 | B2 |  | 9/2020  | Lee et al. |
| 10,815,324 | B2 |  | 10/2020 | Sun et al. |
| 10,975,173 | B2 |  | 4/2021  | Lee et al. |
| 11,643,483 | B2 |  | 5/2023  | Lee et al. |
| 2005/0085602 | A1 | | 4/2005 | Nagy et al. |
| 2005/0192417 | A1 | | 9/2005 | Iseki et al. |
| 2007/0179057 | A1 | * | 8/2007 | Gore ............... G11B 7/00455 |
| 2011/0223406 | A1 | | 9/2011 | Fantinel et al. |
| 2016/0229931 | A1 | | 8/2016 | Yoo et al. |
| 2016/0325486 | A1 | | 11/2016 | McLeod et al. |
| 2017/0029538 | A1 | | 2/2017 | Song et al. |
| 2017/0107307 | A1 | | 4/2017 | Park et al. |
| 2017/0233511 | A1 | | 8/2017 | Sun et al. |
| 2018/0105684 | A1 | * | 4/2018 | Sun ............... C08L 23/26 |
| 2019/0062474 | A1 | | 2/2019 | Kim et al. |
| 2019/0119420 | A1 | | 4/2019 | Park et al. |
| 2019/0161590 | A1 | | 5/2019 | Kwon et al. |
| 2019/0169323 | A1 | | 6/2019 | Lee et al. |
| 2021/0047443 | A1 | | 2/2021 | Jeong et al. |
| 2021/0230322 | A1 | | 7/2021 | Lee et al. |
| 2021/0230323 | A1 | | 7/2021 | Lee et al. |

FOREIGN PATENT DOCUMENTS

| CN | 1495207 A    | 5/2004  |
| CN | 1867594 A    | 11/2006 |
| CN | 102037070 A  | 4/2011  |
| CN | 102216350 A  | 10/2011 |
| CN | 103347910 A  | 10/2013 |
| CN | 104271616 A  | 1/2015  |
| CN | 104284912 A  | 1/2015  |
| CN | 105916896 A  | 8/2016  |
| CN | 106232635 A  | 12/2016 |
| CN | 106536534 A  | 3/2017  |
| CN | 106661160 A  | 5/2017  |
| CN | 108401432 A  | 8/2018  |
| CN | 108884193 A  | 11/2018 |
| CN | 108884194 A  | 11/2018 |
| EP | 0522995      | * 1/1993 |
| EP | 2344551 B1   | 5/2014  |
| EP | 3372620 A1   | 9/2018  |
| EP | 3770185 A1   | 1/2021  |

(Continued)

OTHER PUBLICATIONS

Search Report dated Jul. 26, 2022 from the Office Action for Chinese Application No. 201980030754.2 issued Aug. 18, 2022, 3 pages.

(Continued)

*Primary Examiner* — John M Cooney
*Assistant Examiner* — Jeffrey S Lenihan
(74) *Attorney, Agent, or Firm* — Lerner David LLP

(57) ABSTRACT

A polyethylene according to the present disclosure maintains a stable crystal structure at a high temperature and ensures excellent uniformity in chlorine distribution, thereby preparing a chlorinated polyethylene having excellent chlorination productivity and thermal stability by reacting with chlorine, and may also prepare a PVC compound with improved impact strength by including the chlorinated polyethylene.

19 Claims, 1 Drawing Sheet

(56) References Cited

FOREIGN PATENT DOCUMENTS

| | | | |
|---|---|---|---|
| JP | H08281834 A | 10/1996 |
| JP | 2007218324 A | 8/2007 |
| JP | 2018517586 A | 7/2018 |
| KR | 20040076965 A | 9/2004 |
| KR | 20090074338 A | 7/2009 |
| KR | 20090088620 A | 8/2009 |
| KR | 20120073947 A | 7/2012 |
| KR | 20130001889 A | 1/2013 |
| KR | 20140125726 A | 10/2014 |
| KR | 20140125727 A | 10/2014 |
| KR | 20150057974 A | 5/2015 |
| KR | 20150058938 A | 5/2015 |
| KR | 20160045434 A | 4/2016 |
| KR | 20160123123 A | 10/2016 |
| KR | 20170030924 A | 3/2017 |
| KR | 101723774 B1 | 4/2017 |
| KR | 20180000706 A | 1/2018 |
| KR | 20180067945 A | 6/2018 |
| KR | 20180071160 A | 6/2018 |
| KR | 20180071853 A | 6/2018 |
| KR | 20180103349 A | 9/2018 |
| WO | 9950316 A1 | 10/1999 |
| WO | 2004076502 A1 | 9/2004 |
| WO | 2013037432 A1 | 3/2013 |
| WO | 2014086468 A1 | 6/2014 |
| WO | 2019139355 A1 | 7/2019 |
| WO | 2020089003 A1 | 5/2020 |
| WO | 2020122561 A1 | 6/2020 |
| WO | 2020122563 A1 | 6/2020 |

OTHER PUBLICATIONS

Search report from International Application No. PCT/KR2019/017397, mailed Apr. 3, 2020.
Alexakis et al., "Mild Protection and Deprotection of Alcohols as Ter-Butyl Ethers in the Field of Pheromone Synthesis," Tetrahedron Letters, vol. 29, No. 24, 1988, pp. 2951-2954.
Search report fom International Application No. PCT/KR2019/017398, mailed Apr. 3, 2020.
Search report from International Application No. PCT/KR2019/017399, mailed Apr. 3, 2020.
Extended European Search Report including Written Opinion for Application No. 19894608.9 dated Jun. 29, 2021, 10 pages.
Extended European Search Report including Written Opinion for Application No. 19896315.9, dated Jun. 14, 2021, 8 pages.
Extended European Search Report including Written Opinion for Application No. 19897421.4 dated Jul. 27, 2021, 9 pages.

* cited by examiner

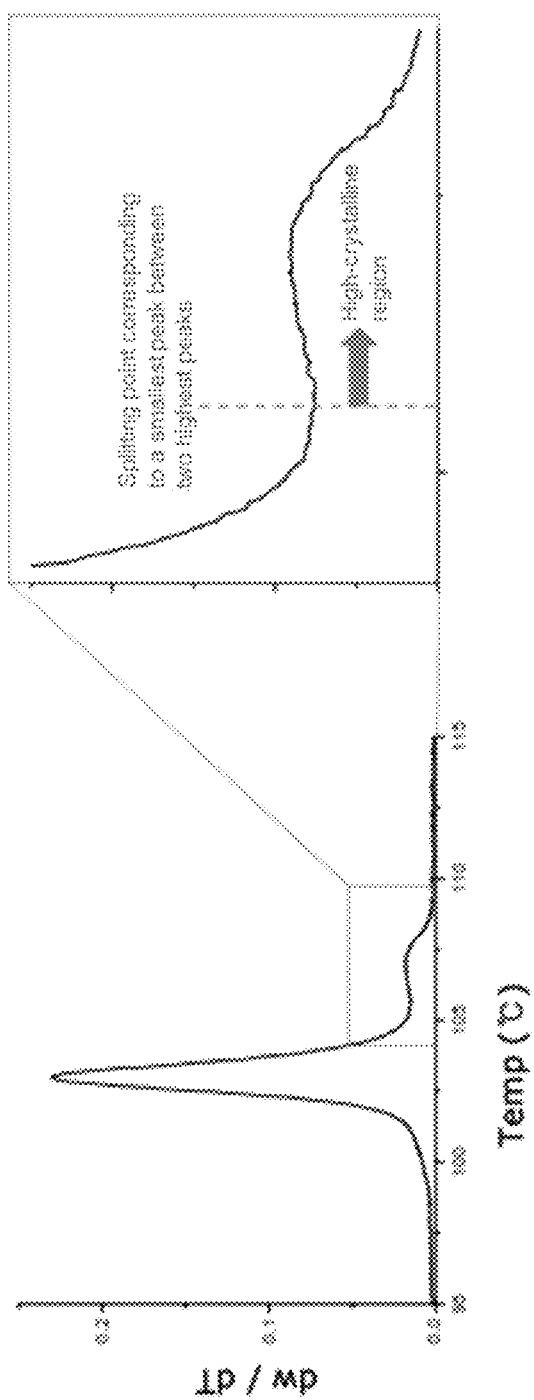

POLYETHYLENE AND CHLORINATED POLYETHYLENE THEREOF

CROSS-REFERENCE TO RELATED APPLICATION(S)

This application is a national phase entry under 35 U.S.C. § 371 of International Application No. PCT/KR2019/017398 filed Dec. 10, 2019, which claims priority from Korean Patent Application No. 10-2018-0158328 filed Dec. 10, 2018, Korean Patent Application No. 10-2019-0007089 filed Jan. 18, 2019, and Korean Patent Application No. 10-2019-0163116 filed Dec. 9, 2019, all of which are incorporated herein by reference.

TECHNICAL FIELD

The present disclosure relates to a polyethylene which can prepare a chlorinated polyethylene having excellent chlorination productivity and thermal stability to improve impact strength of PVC compound by maintaining a stable crystal structure at a high temperature and ensuring excellent uniformity in chlorine distribution, and a chlorinated polyethylene thereof.

BACKGROUND

Chlorinated polyethylenes prepared by reacting polyethylenes with chlorine are known to have better physical and mechanical properties than the polyethylene, and in particular, they can resist harsh external environments, and thus, can be used as a packing material such as various containers, fibers and pipes and a heat transfer material.

Chlorinated polyethylenes are generally prepared by making the polyethylene in suspension and then reacting with chlorine, or by placing the polyethylene in an aqueous HCl solution and then reacting with chlorine to replace hydrogen of the polyethylene with chlorine.

In order to fully express properties of the chlorinated polyethylene, the chlorine must be uniformly substituted in the polyethylene, which is affected by the properties of the polyethylene reacting with chlorine. In particular, chlorinated polyethylenes (CPE) are widely used for an impact reinforcing agent for pipes and window profiles by compounding with PVC, and are generally prepared by reacting polyethylene with chlorine in a suspension, or by reacting polyethylene with chlorine in aqueous HCl solution. This PVC compound product requires excellent impact strength, and the strength of the compound varies depending on physical properties of the chlorinated polyethylene. In particular, as the elongation of CPE increases, the impact strength of the final product is excellent, and for this purpose, it is preferable that chlorine is uniformly distributed in the HDPE chain. In the case of general-purpose chlorinated polyethylenes which are widely known at present, since a polyethylene prepared using Ziegler-Natta catalyst is applied, the uniformity in chlorine distribution is decreased in the polyethylene due to the broad molecular weight distribution and a high content of ultra-high molecular weight. There is also a disadvantage in that the impact strength is insufficient when compounded with PVC.

In addition, processes of chlorination, deoxidation, dehydration, and drying are performed for preparing CPE. When the crystal structure of HDPE is not maintained stably, the crystal structure may collapse and pores of polyethylene (PE) particles may be blocked through a chlorination reaction at a high temperature. After the deoxidation process, washing with water is required to remove residual HCl in the PE particles. When the pores are blocked, a total production time is prolonged due to the prolonged deoxidation time and chlorine productivity may be lowered.

Accordingly, excellent uniformity in chlorine distribution is required in the chlorinated polyethylene in order to improve impact strength of PVC compound. Thus, there is a continuous demand for developing a method for preparing a polyethylene maintaining a stable crystal structure to improve productivity in the chlorination process.

DETAILED DESCRIPTION OF THE INVENTION

Technical Problem

The present disclosure is to provide a polyethylene which can prepare a chlorinated polyethylene having excellent chlorination productivity and thermal stability to improve impact strength of PVC compound by maintaining a stable crystal structure at a high temperature and ensuring excellent uniformity in chlorine distribution, and a chlorinated polyethylene thereof.

In addition, the present disclosure is to provide a method for preparing the polyethylene.

Technical Solution

According to one embodiment of the present disclosure, there is provided a polyethylene having a high-crystalline region ratio on a temperature rising elution fractionation (TREF) graph of 12.5% or less, wherein the high-crystalline region ratio is obtained by dividing a graph area of the high-crystalline region having an elution temperature, which is a splitting point corresponding to a smallest peak between two highest peaks, or more by a total graph area in percentage.

In addition, the present disclosure provides a method for preparing the polyethylene.

The present disclosure also provides a chlorinated polyethylene prepared by reacting the polyethylene with chlorine.

Advantageous Effects

A polyethylene according to the present disclosure is reacted with chlorine to prepare a chlorinated polyethylene having excellent chlorination productivity and thermal stability by maintaining a stable crystal structure at a high temperature and ensuring excellent uniformity in chlorine distribution.

BRIEF DESCRIPTION OF THE DRAWINGS

The FIGURE is a temperature rising elution fractionation (TREF) graph for the polyethylenes of Examples 1 to 2 according to one embodiment of the present disclosure, on which a high-crystalline region is illustrated.

DETAILED DESCRIPTION OF THE EMBODIMENTS

In the present disclosure, the terms "the first", "the second", and the like are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, numbers, steps, components, or combinations thereof, but do not preclude the presence or addition of one or more other features, numbers, steps, components, or combinations thereof.

The terminology "about" or "substantially" is intended to have meanings close to numerical values or ranges specified with an allowable error and intended to prevent accurate or absolute numerical values disclosed for understanding of the present invention from being illegally or unfairly used by any unconscionable third party.

For reference, "parts by weight" as used herein refers to a relative concept of a ratio of the weight of the material based on the weight of a specific material. For example, in a mixture containing 50 g of material A, 20 g of material B, and 30 g of material C, the amounts of material B and C based on 100 parts by weight of material A are 40 parts by weight and 60 parts by weight, respectively.

In addition, "wt % (% by weight)" refers to an absolute concept of expressing the weight of a specific material in percentage based on the total weight. In the above-described mixture, the contents of material A, B and C based on 100% of the total weight of the mixture are 50%, 20% and 30% by weight, respectively. At this time, a sum of contents of each component does not exceed 100 weight %.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present disclosure will be described in more detail.

According to one embodiment of the present disclosure, there is provided a polyethylene capable of preparing a chlorinated polyethylene having excellent chlorination productivity and thermal stability to improve impact strength of PVC compound by maintaining a stable crystal structure at a high temperature and ensuring excellent uniformity in chlorine distribution.

The polyethylene is characterized in that a high-crystalline region ratio on a temperature rising elution fractionation (TREF) graph is 12.5% or less, wherein the high-crystalline region ratio is obtained by dividing a graph area of the high-crystalline region having an elution temperature, which is a splitting point corresponding to a smallest peak between two highest peaks, or more by a total graph area in percentage.

In general, chlorinated polyethylenes are produced by reacting polyethylenes with chlorine, which means that a part of hydrogen of the polyethylene is substituted with chlorine. When hydrogen of the polyethylene is substituted with chlorine, properties of the polyethylene are changed because atomic volumes of hydrogen and chlorine are different. For example, chlorination productivity and thermal stability are further increased. In particular, the smaller and uniform the overall size of the chlorinated polyethylene particles, the more easily the chlorine penetrates to the center of the polyethylene particles, so that the degree of chlorine substitution in the particles can be uniform, thereby exhibiting excellent physical properties. To this end, the polyethylene according to the present disclosure may provide a chlorinated polyethylene having a high alpha transition temperature and a low high-crystalline region ratio according to temperature rising elution fractionation (TREF) analysis, thereby exhibiting better chlorination productivity and thermal stability.

The polyethylene of the present disclosure is characterized by a low content of high-crystalline region in the molecular structure, which may increase elongation of CPE through uniform chlorine substitution. In addition, the polyethylene of the present disclosure has a high alpha transition temperature, so that the crystal structure may be stably maintained even at high temperatures. Thus, it is possible to shorten the deoxidation time and improve the chlorination productivity by maintaining the crystal structure during the chlorination reaction at a high temperature to prevent pores of polyethylene particles from clogging. As a result, the polyethylene of the present disclosure may prepare a chlorinated polyethylene having excellent chlorination productivity and thermal stability, and can increase the elongation of CPE through uniform chlorine substitution, thereby improving impact strength when applied as an impact reinforcing material to the PVC compound.

The polyethylene according to the present disclosure may be an ethylene homopolymer which does not contain a separate copolymer.

The polyethylene may have an alpha transition temperature of about 120° C. or more or about 120° C. to about 145° C., about 122° C. or more or about 122° C. to about 145° C., or about 125° C. or more or about 125° C. to about 145° C. Herein, the alpha transition temperature refers to a temperature at which a change in the crystal arrangement occurs while a lamellar structure forming the crystal is maintained, and can be measured by thermal analysis of polyethylene. Specifically, the alpha transition temperature was measured by lowering the temperature to −60° C., maintaining at that temperature for 5 minutes, increasing the temperature to 140° C., and then determining the top of the tan δ curve as the alpha transition temperature using dynamic mechanical analyzer (DMA). The change in the crystal arrangement of the polyethylene occurs around the alpha transition temperature. The polyethylene of the present disclosure has the alpha transition temperature of 120° C. or more, which is close to the melting temperature, so that the change in the crystal arrangement occurs at a higher temperature, and the morphology of polyethylene particles is difficult to change during chlorination. Therefore, high chlorination productivity can be ensured.

As described above, the polyethylene of the present disclosure is characterized by a low high-crystalline region ratio on temperature rising elution fractionation (TREF) graph with the high alpha transition temperature.

The polyethylene may have the low high-crystalline region ratio on a temperature rising elution fractionation (TREF) graph of about 12.5% or less, or about 5% to about 12.5%. Specifically, the high-crystalline region ratio may be about 12% or less or about 5% to about 12%, or about 11.8% or less or about 5% to about 11.8%. Specifically, the lower the high-crystalline region ratio, the more easily the chlorine molecules penetrates into the crystal. Thus, the high-crystalline region ratio should be about 12% or less in terms of uniform chlorination reaction. When the high-crystalline region ratio is too low, the alpha transition temperature may also decrease, so that the high-crystalline region ratio may preferably be about 5% or more.

The high-crystalline region ratio may be obtained from a temperature rising elution fractionation (TREF) graph for polyethylene, as illustrated in one embodiment of the FIGURE. First, a temperature rising elution fractionation (TREF) graph for polyethylene is obtained, and an elution temperature, which is a splitting point corresponding to a smallest peak (minimum value) between two highest peaks among the peaks appearing on the TREF graph, is used as a reference for the high-crystalline region. The elution temperature of the minimum value is made into the vertical axis and the region having the elution temperature or more is called as a high-crystalline region. From this, a graph area of the high-crystalline region having an elution temperature or more is measured, and the high-crystalline region ratio (%) is obtained by dividing the graph area by a total graph area in percentage.

Specifically, the temperature rising elution fractionation (TREF) graph for polyethylene may be obtained using Agilent Technologies 7890A manufactured by PolymerChar. For example, a sample is dissolved in 20 mL of 1,2,4-trichlorobenzene at a concentration of 1.5 mg/mL, then dissolved by increasing the temperature at a rate of 40° C./min from 30° C. to 150° C., then recrystallized by lowering the temperature at a rate of 0.5° C./min to 35° C., and then eluted by increasing the temperature at a rate of 1° C./min to 140° C. to obtain the graph.

The temperature rising elution fractionation (TREF) graph of polyethylene thus obtained has the elution temperature (° C.) on X axis, and the amount of elution at that temperature (dW/dt) on Y axis, as illustrated in one embodiment of the FIGURE. The region having a temperature equal to or higher than the splitting point between two peaks on the TREF graph is called as the high-crystalline region. That is, the elution temperature, which is the minimum value between two peaks, is made into the vertical axis, and a value obtained by integrating an area of the graph having a temperature equal to or higher than the elution temperature may be referred to as an area of the high-crystalline region. A percentage value obtained by dividing an area of the high-crystalline region by a total graph area may be referred to as the high-crystalline region ratio.

Since the polyethylene is prepared by optimizing a specific metallocene catalyst, the alpha transition temperature is high and the high-crystalline region ratio according to temperature rising elution fractionation (TREF) analysis is low as described above. As a result, the polyethylene according to the present disclosure has a feature of exhibiting better chlorination productivity and thermal stability when preparing a chlorinated polyethylene.

The polyethylene may have a melt index ($MI_5$) measured at a temperature of 190° C. under a load of 5 kg in accordance with ASTM D 1238 of about 0.1 g/10 min to about 1.5 g/10 min, about 0.15 g/10 min to about 1.2 g/10 min, about 0.18 g/10 min to about 1.0 g/10 min, or about 0.2 g/10 min to about 0.35 g/10 min. The melt index $MI_5$ may be about 1.5 g/10 min or less in terms of excellent thermal stability, because the viscosity becomes higher as the MI is lower and PE particles are less morphologically changed in a high temperature slurry state for chlorination. The melt index $MI_5$ may be 0.1 g/10 min or more in terms of improving processability due to a lower viscosity as MI is higher.

In addition, the polyethylene may have a melt flow rate ratio ($MFRR_{21.6/5}$, a value obtained by dividing the melt index measured at 190° C. under a load of 21.6 kg by the melt index measured at 190° C. under a load of 5 kg in accordance with ASTM D 1238) of about 10 to about 20, or about 11 to about 18.

The polyethylene may have a density of about 0.947 g/cm$^3$ to about 0.957 g/cm$^3$, or about 0.948 g/cm$^3$ to about 0.954 g/cm$^3$. This means that the polyethylene has a high content of crystaline part and is dense, and the crystal structure of the polyethylene is difficult to change during chlorination.

The polyethylene of the present disclosure may have a molecular weight distribution of 2 to 10, 3 to 7, or 3.5 to 6. This means that the molecular weight distribution of the polyethylene is narrow. When the molecular weight distribution is broad, a difference in the molecular weight between polyethylenes is large, so the chlorine content of the polyethylenes after the chlorination reaction may vary, and the uniform distribution of chlorine is difficult. In addition, when a low molecular weight component is melted, fluidity becomes high, so that pores of polyethylene particles may be blocked to reduce the chlorination productivity. However, since the polyethylene of the present disclosure has the molecular weight distribution as described above, the difference in molecular weight between polyethylenes after the chlorination reaction is not large, and chlorine may be uniformly substituted.

For examples, the molecular weight distribution (MWD, polydispersity index) may be measured using gel permeation chromatography (GPC, manufactured by Water). The MWD may be determined by measuring a weight average molecular weight (Mw) and a number average molecular weight (Mn), and then dividing the weight average molecular weight by the number average molecular weight.

Specifically, PL-GPC220 manufactured by Waters may be used as the gel permeation chromatography (GPC) instrument, and a Polymer Laboratories PLgel MIX-B 300 mm length column may be used. An evaluation temperature may be 160° C., and 1,2,4-trichlorobenzene may be used for a solvent at a flow rate of 1 mL/min. Each polyethylene sample may be pretreated by dissolving in 1,2,4-trichlorobenzene containing 0.0125% of BHT for 10 hours using a GPC analyzer (PL-GP220), and the sample with a concentration of 10 mg/10 mL may be supplied in an amount of 200 microleters (μL). Mw and Mn may be obtained using a calibration curve formed using a polystyrene standard. 9 kinds of the polystyrene standard are used with the molecular weight of 2000 g/mol, 10000 g/mol, 30000 g/mol, 70000 g/mol, 200000 g/mol, 700000 g/mol, 2000000 g/mol, 4000000 g/mol, 10000000 g/mol.

The polyethylene may have a weight average molecular weight of about 160000 g/mol to about 260000 g/mol, about 170000 g/mol to about 250000 g/mol, or about 180000 g/mol to about 240000 g/mol. This means that the polyethylene has a high molecular weight and a high content of a high molecular weight component, which leads to an effect of increasing the content of a linking molecule to be described later.

According to another embodiment of the present disclosure, there is provided a method for preparing the above-described polyethylene.

The method for preparing the polyethylene according to the present disclosure may include the step of polymerizing ethylene in the presence of at least one first metallocene compound represented by the following Chemical Formula 1; and at least one second metallocene compound selected from the compounds represented by the following Chemical Formula 2:

[Chemical Formula 1]

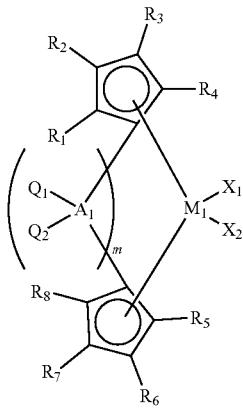

in Chemical Formula 1, at least one of $R_1$ to $R_8$ is —$(CH_2)_n$—OR, wherein R is $C_{1-6}$ linear or branched alkyl and n is an integer of 2 to 6;

the rest of $R_1$ to $R_8$ are the same as or different from each other, and are each independently selected from the group consisting of hydrogen, halogen, $C_{1-20}$ alkyl, $C_{2-20}$ alkenyl, $C_{6-20}$ aryl, $C_{7-40}$ alkylaryl, and $C_{7-40}$ arylalkyl, or two or more substituents adjacent to each other may be connected with each other to form a $C_{6-20}$ aliphatic or aromatic ring unsubstituted or substituted with a $C_{1-10}$ hydrocarbyl group;

$Q_1$ and $Q_2$ are the same as or different from each other, and are each independently hydrogen, halogen, $C_{1-20}$ alkyl, $C_{2-20}$ alkenyl, $C_{2-20}$ alkoxyalkyl, $C_{6-20}$ aryl, $C_{7-40}$ alkylaryl, or $C_{7-40}$ arylalkyl;

$A_1$ is carbon (C), silicon (Si), or germanium (Ge);

$M_1$ is a Group 4 transition metal;

$X_1$ and $X_2$ are the same as or different from each other, and are each independently halogen, $C_{1-20}$ alkyl, $C_{2-20}$ alkenyl, $C_{6-20}$ aryl, a nitro group, an amido group, $C_{1-20}$ alkylsilyl, $C_{1-20}$ alkoxy, or a $C_{1-20}$ sulfonate group; and m is an integer of 0 or 1,

[Chemical Formula 2]

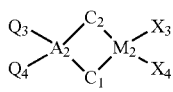

in Chemical Formula 2, $Q_3$ and $Q_4$ are the same as or different from each other, and are each independently hydrogen, halogen, $C_{1-20}$ alkyl, $C_{2-20}$ alkenyl, $C_{2-20}$ alkoxyalkyl, $C_{6-20}$ aryl, $C_{7-40}$ alkylaryl, or $C_{7-40}$ arylalkyl;

$A_2$ is carbon (C), silicon (Si), or germanium (Ge);

$M_2$ is a Group 4 transition metal;

$X_3$ and $X_4$ are the same as or different from each other, and are each independently halogen, $C_{1-20}$ alkyl, $C_{2-20}$ alkenyl, $C_{6-20}$ aryl, a nitro group, an amido group, $C_{1-20}$ alkylsilyl, $C_{1-20}$ alkoxy, or a $C_{1-20}$ sulfonate group; and one of $C_1$ and $C_2$ is represented by the following Chemical Formula 3a or 3b, and the other is represented by the following Chemical Formula 3c, 3d or 3e;

[Chemical Formula 3a]

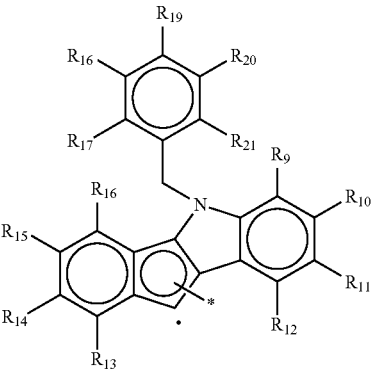

[Chemical Formula 3b]

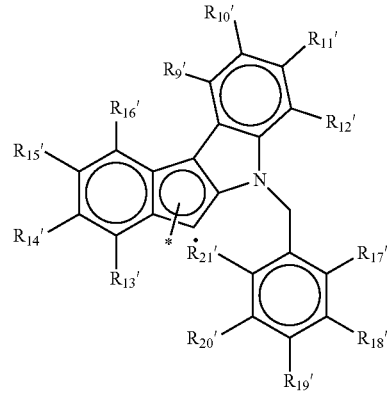

[Chemical Formula 3c]

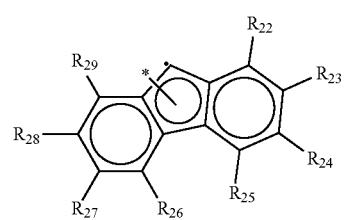

[Chemical Formula 3d]

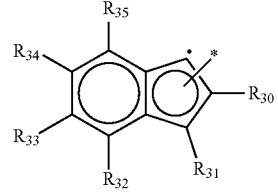

[Chemical Formula 3e]

in Chemical Formulae 3a, 3b, 3c, 3d and 3e, $R_9$ to $R_{39}$ and $R_{17□}$ to $R_{21□}$ are the same as or different from each other, and are each independently hydrogen, halogen, $C_{1-20}$ alkyl, $C_{1-20}$ haloalkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-20}$ aryl, $C_{7-40}$ alkylaryl, or $C_{7-40}$ arylalkyl, provided that at least one of $R_{17}$ to $R_{21}$ and $R_{17□}$ to $R_{21□}$ is $C_{1-20}$ haloalkyl, two or more substituents adjacent to each other of $R_{22}$ to $R_{39}$ may be connected with each other to form a $C_{6-20}$ aliphatic or aromatic ring unsubstituted or substituted with a $C_{1-10}$ hydrocarbyl group;
- • represents a site of binding to $A_1$, and
- * represents a site of binding to $M_1$.

Unless otherwise specified herein, the following terms may be defined as follows.

The halogen may be fluorine (F), chlorine (Cl), bromine (Br) or iodine (I).

The hydrocarbyl group is a monovalent functional group in which a hydrogen atom is removed from hydrocarbon, and may include an alkyl group, an alkenyl group, an alkynyl group, an aryl group, an aralkyl group, an aralkenyl group, an aralkynyl group, an alkylaryl group, an alkenylaryl group, an alkynylaryl group, and the like. In addition, the $C_{1-30}$ hydrocarbyl group may be a $C_{1-20}$ hydrocarbyl group or a $C_{1-10}$ hydrocarbyl group. For example, the hydrocarbyl group may be linear, branched or cyclic alkyl. More specifically, the $C_{1-30}$ hydrocarbyl group may be a linear, branched or cyclic alkyl group such as a methyl group, an ethyl group, an n-propyl group, an iso-propyl group, an n-butyl group, an iso-butyl group, a tert-butyl group, an n-pentyl group, an n-hexyl group, an n-heptyl group and a cyclohexyl group; or an aryl group such as phenyl, biphenyl, naphthyl, anthracenyl, phenanthrenyl, or fluorenyl. Moreover, it may be alkylaryl such as methylphenyl, ethylphenyl, methylbiphenyl, and methylnaphthyl, or arylalkyl such as phenylmethyl, phenylethyl, biphenylmethyl, and naphthylmethyl. It may also be alkenyl such as allyl, ethenyl, propenyl, butenyl, and pentenyl.

In addition, the $C_{1-20}$ alkyl may be linear, branched or cyclic alkyl. Specifically, the $C_{1-20}$ alkyl may be $C_{1-20}$ linear alkyl; $C_{1-15}$ linear alkyl; $C_{1-5}$ linear alkyl; $C_{3-20}$ branched or cyclic alkyl; $C_{3-15}$ branched or cyclic alkyl; or $C_{3-10}$ branched or cyclic alkyl. For example, the $C_{1-20}$ alkyl may include methyl, ethyl, propyl, isopropyl, n-butyl, tert-butyl, pentyl, hexyl, heptyl, octyl, cyclopropyl, cyclobutyl, cyclopentyl, cyclohexyl, cycloheptyl, cyclooctyl, and the like, but the present disclosure is not limited thereto.

The $C_{2-20}$ alkenyl includes linear or branched alkenyl, and may specifically include allyl, ethenyl, propenyl, butenyl, pentenyl, and the like, but the present disclosure is not limited thereto.

The $C_{1-20}$ alkoxy may include methoxy, ethoxy, isopropoxy, n-butoxy, tert-butoxy, cyclohexyloxy, and the like, but the present disclosure is not limited thereto.

The $C_{2-20}$ alkoxyalkyl group is a functional group in which at least one hydrogen of the above-mentioned alkyl is substituted with alkoxy, and it may include methoxymethyl, methoxyethyl, ethoxymethyl, iso-propoxymethyl, iso-propoxyethyl, iso-propoxypropyl, iso-propoxyhexyl, tert-butoxymethyl, tert-butoxyethyl, tert-butoxypropyl, tert-butoxyhexyl, and the like, but the present disclosure is not limited thereto.

The $C_{6-40}$ aryloxy may include phenoxy, biphenoxyl, naphthoxy, and the like, but the present disclosure is not limited thereto.

The $C_{7-40}$ aryloxyalkyl group is a functional group in which at least one hydrogen of the above-mentioned alkyl is substituted with aryloxy, and it may include phenoxymethyl, phenoxyethyl, phenoxyhexyl, and the like, but the present disclosure is not limited thereto.

The $C_{1-20}$ alkylsilyl or the $C_{1-20}$ alkoxysilyl is a functional group in which 1 to 3 hydrogens of $—SiH_3$ are substituted with 1 to 3 alkyl groups or alkoxy groups described above, and it may include alkylsilyl such as methylsilyl, dimethylsilyl, trimethylsilyl, dimethylethylsilyl, diethylmethylsilyl or dimethylpropylsilyl; alkoxysilyl such as methoxysilyl, dimethoxysilyl, trimethoxysilyl or dimethoxyethoxysilyl; or alkoxyalkylsilyl such as methoxydimethylsilyl, diethoxymethylsilyl or dimethoxypropylsilyl; and the like, but the present disclosure is not limited thereto.

The $C_{1-20}$ silylalkyl is a functional group in which at least one hydrogen of the above-mentioned alkyl is substituted with silyl, and it may include $—CH_2—SiH_3$, methylsilylmethyl or dimethylethoxysilylpropyl, and the like, but the present disclosure is not limited thereto.

In addition, the $C_{1-20}$ alkylene is the same as the above-mentioned alkyl except that it is a divalent substituent, and it may include methylene, ethylene, propylene, butylene, pentylene, hexylene, heptylene, octylene, cyclopropylene, cyclobutylene, cyclopentylene, cyclohexylene, cycloheptylene, cyclooctylene, and the like, but the present disclosure is not limited thereto.

The $C_{6-20}$ aryl may be a monocyclic, bicyclic or tricyclic aromatic hydrocarbon. For example, the $C_{6-20}$ aryl may include phenyl, biphenyl, naphthyl, anthracenyl, phenanthrenyl, fluorenyl, and the like, but the present disclosure is not limited thereto.

The $C_{7-20}$ alkylaryl may refer to a substituent in which at least one hydrogen of the aromatic ring is substituted with the above-mentioned alkyl. For example, the $C_{7-20}$ alkylaryl may include methylphenyl, ethylphenyl, methylbiphenyl, methylnaphthyl, and the like, but the present disclosure is not limited thereto.

The $C_{7-20}$ arylalkyl may refer to a substituent in which at least one hydrogen of the alkyl is substituted with the above-mentioned aryl. For example, the $C_{7-20}$ arylalkyl may include phenylmethyl, phenylethyl, biphenylmethyl, naphthylmethyl, and the like, but the present disclosure is not limited thereto.

In addition, the $C_{6-20}$ arylene is the same as the above-mentioned aryl except that it is a divalent substituent, and it may include phenylene, biphenylene, naphthylene, anthracenylene, phenanthrenylene, fluorenylene, and the like, but the present disclosure is not limited thereto.

The Group 4 transition metal may be titanium (Ti), zirconium (Zr), hafnium (Hf), or rutherfordium (Rf), and may specifically be titanium (Ti), zirconium (Zr), or hafnium (Hf). More specifically, it may be zirconium (Zr), or hafnium (Hf), but the present disclosure is not limited thereto.

Further, the Group 13 element may be boron (B), aluminum (Al), gallium (Ga), indium (In), or thallium (Tl), and may specifically be boron (B) or aluminum (Al), but the present disclosure is not limited thereto.

The first metallocene compound may be represented by any one of the following Chemical Formulae 1-1 to 1-4.

[Chemical Formula 1-1]

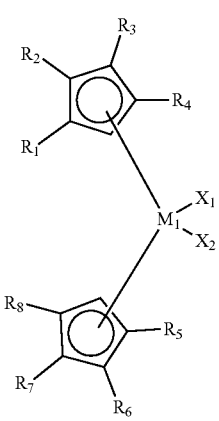

-continued

[Chemical Formula 1-2]

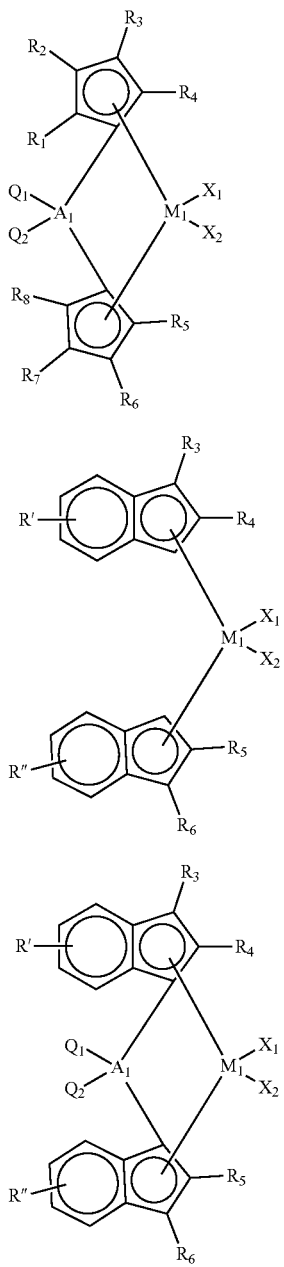

[Chemical Formula 1-3]

[Chemical Formula 1-4]

in Chemical Formulae 1-1 to 1-4, $Q_1$, $Q_2$, $A_1$, $M_1$, $X_1$, $X_2$, and $R_1$ to $R_8$ are the same as defined in Chemical Formula 1, and R□ and R" are the same as or different from each other, and are each independently a $C_{1-10}$ hydrocarbyl group.

Specifically, each of the $Q_1$ and $Q_2$ may be $C_{1-3}$ alkyl, and preferably be methyl.

Specifically, each of the $X_1$ and $X_2$ may be halogen, and preferably be chloro.

Specifically, $A_1$ may be silicon (Si).

Specifically, $M_1$ may be zirconium (Zr) or hafnium (Hf).

Specifically, each of the $R_1$ to $R_8$ may be hydrogen, or $C_{1-20}$ alkyl, or $C_{1-10}$ alkyl, or $C_{1-6}$ alkyl, or $C_{2-6}$ alkyl substituted with $C_{1-6}$ alkoxy, or $C_{4-6}$ alkyl substituted with $C_{1-4}$ alkoxy. Or, two or more substituents adjacent to each other of $R_{32}$ to $R_{39}$ may be connected with each other to form a $C_{6-20}$ aliphatic or aromatic ring substituted with $C_{1-3}$ alkyl.

Preferably, each of the $R_3$ and $R_6$ may be $C_{1-6}$ alkyl, or $C_{2-6}$ alkyl substituted with $C_{1-6}$ alkoxy, or $C_{4-6}$ alkyl, or $C_{4-6}$ alkyl substituted with $C_{1-4}$ alkoxy. For example, each of the $R_3$ and $R_6$ may be n-butyl, n-pentyl, n-hexyl, tert-butoxy butyl, or tert-butoxy hexyl.

And, $R_1$, $R_2$, $R_4$, $R_5$, $R_7$, and $R_8$ may be hydrogen.

The compound represented by the Chemical Formula 1 may be, for example, a compound represented by one of the following structural formulae, but is not limited thereto.

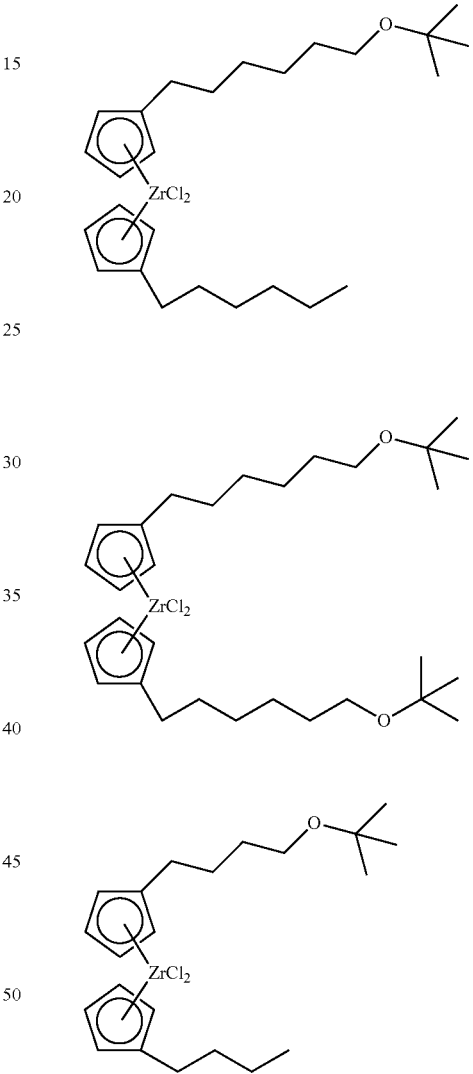

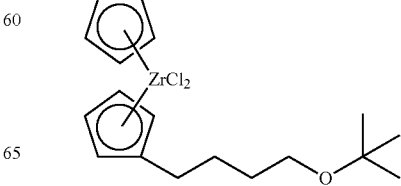

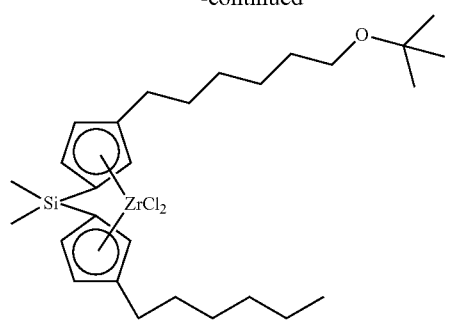
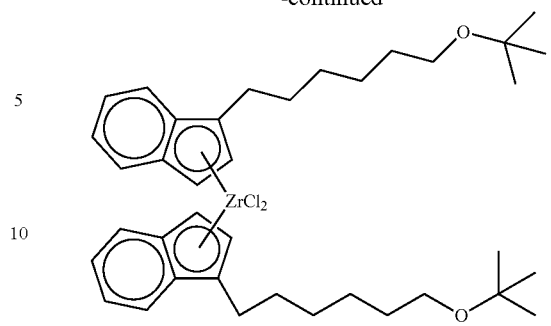
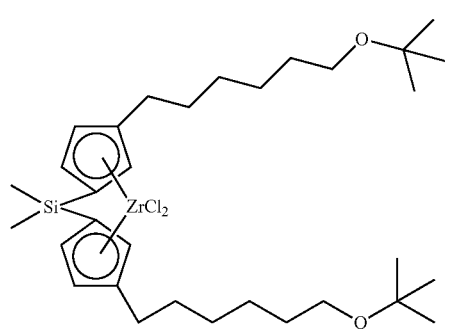
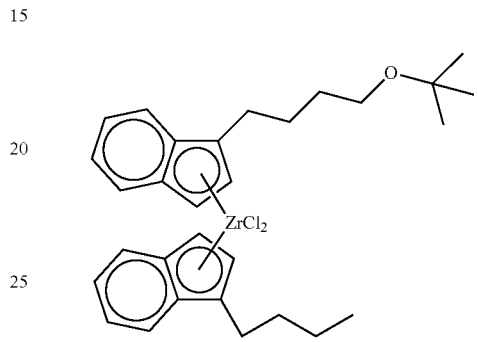
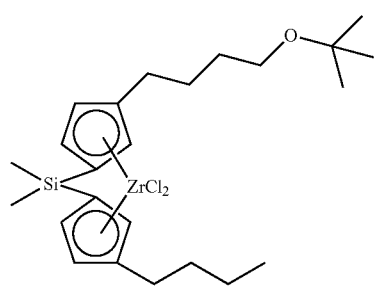
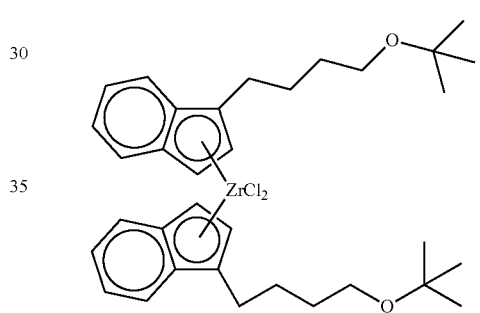
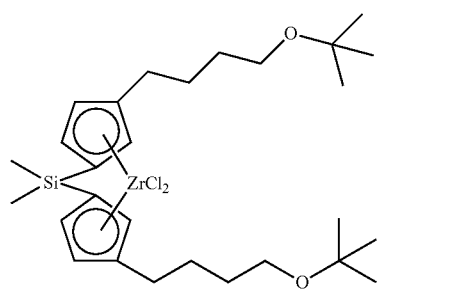
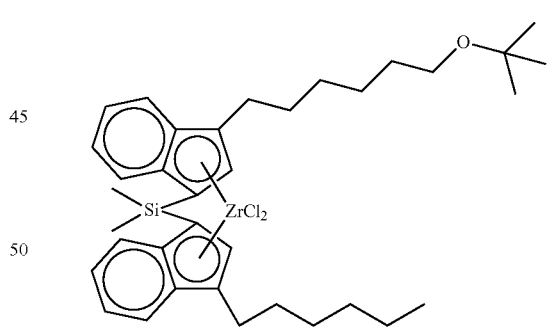
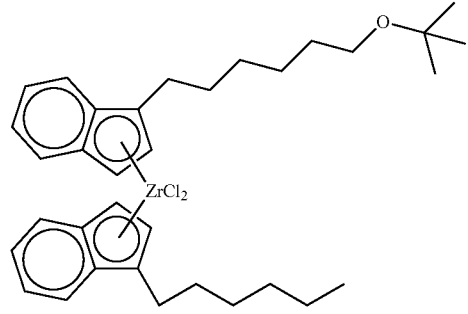
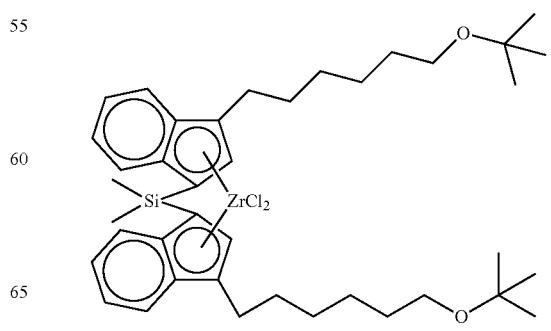

-continued

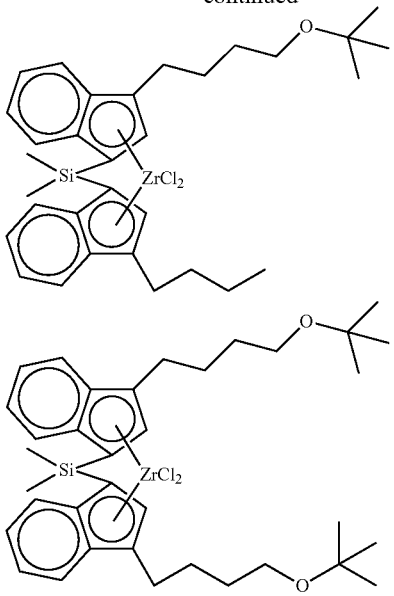

The first metallocene compound represented by the above structural formula may be synthesized by applying known reactions, and a detailed synthesis method may be referred to Examples.

In the method for preparing a polyethylene according to the present disclosure, at least one first metallocene compound represented by the Chemical Formula 1, Chemical Formula 1-1, 1-2, 1-3, or 1-4 as described above is used together with at least one second metallocene compound described below. Thus, it is possible to achieve high productivity and excellent impact strength during PVC compound processing in the CPE process described below by optimizing the high-crystalline region ratio according to temperature rising elution fractionation (TREF) analysis while increasing the alpha transition temperature of polyethylene.

Meanwhile, the second metallocene compound may be represented by the following Chemical Formula 2-1.

[Chemical Formula 2-1]

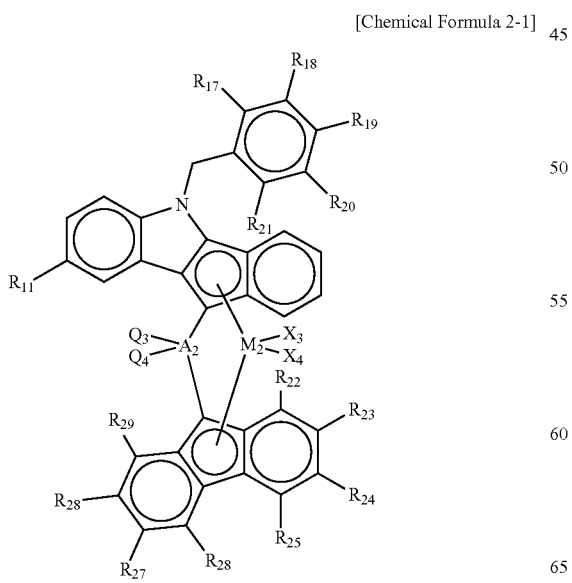

in Chemical Formula 2-1, $Q_3$, $Q_4$, $A_2$, $M_2$, $X_3$, $X_{24}$, $R_{11}$, and $R_{17}$ to $R_{29}$ are the same as defined in Chemical Formula 2.

Specifically, each of the $Q_3$ and $Q_4$ may be $C_{1-3}$ alkyl, or $C_{2-12}$ alkoxyalkyl, and preferably be methyl or tert-butoxyhexyl.

Specifically, each of the $X_3$ and $X_4$ may be halogen, and preferably be chloro.

Specifically, $A_2$ may be silicon (Si).

Specifically, $M_2$ may be zirconium (Zr) or hafnium (Hf), and preferably be zirconium (Zr).

Specifically, each of the $R_{17}$ to $R_{21}$ and $R_{17\square}$ to $R_{21\square}$ may be hydrogen, or $C_{1-6}$ haloalkyl, and preferably be hydrogen, or $C_{1-3}$ haloalkyl. For example, $R_{17}$ to $R_{20}$ or $R_{17\square}$ to $R_{20\square}$ may be hydrogen, and $R_{21}$ or $R_{21\square}$ may be trihalomethyl, preferably trifluoromethyl.

Specifically, each of the $R_{11}$ and $R_{11\square}$ may be $C_{1-6}$ linear or branched alkyl, or $C_{1-3}$ linear or branched alkyl, and preferably be methyl.

Specifically, each of the $R_{22}$ to $R_{29}$ may be hydrogen, or $C_{1-20}$ alkyl, or $C_{1-10}$ alkyl, or $C_{1-6}$ alkyl, or $C_{1-3}$ alkyl. Or, two or more substituents adjacent to each other of $R_{22}$ to $R_{29}$ may be connected with each other to form a $C_{6-20}$ aliphatic or aromatic ring substituted with $C_{1-3}$ alkyl.

Specifically, each of the $R_{30}$ to $R_{35}$ may be hydrogen, or $C_{1-20}$ alkyl, or $C_{1-10}$ alkyl, or $C_{1-6}$ alkyl, or $C_{1-3}$ alkyl.

Specifically, each of the $R_{26}$ to $R_{29}$ may be hydrogen, or $C_{1-20}$ alkyl, or $C_{1-10}$ alkyl, or $C_{1-6}$ alkyl, or $C_{1-3}$ alkyl.

The compound represented by the Chemical Formula 2 may be, for example, a compound represented by the following structural formula, but is not limited thereto.

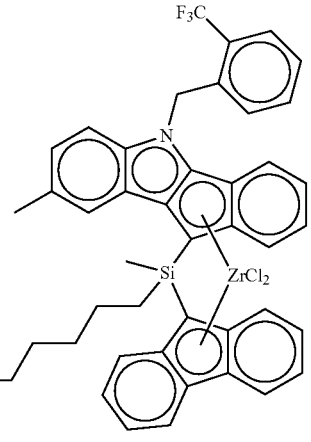

The second metallocene compound represented by the above structural formula may be synthesized by applying known reactions, and a detailed synthesis method may be referred to Examples.

A preparing method of the metallocene compound is described in detail in the Examples to be described later.

The metallocene catalyst used in the present disclosure may be supported on a support together with a cocatalyst compound.

In the supported metallocene catalyst according to the present disclosure, the cocatalyst supported on a support for activating the metallocene compound is an organometallic compound containing a Group 13 metal and is not particularly limited as long as it can be used in the polymerization of olefins in the presence of a general metallocene catalyst.

The cocatalyst is an organometallic compound containing a Group 13 metal and is not particularly limited as long as it can be used in the polymerization of ethylene in the presence of a general metallocene catalyst.

Specifically, the cocatalyst may be at least one selected from the group consisting of the compounds represented by the following Chemical Formulae 4 to 6:

—[Al(R$_{40}$)—O]$_c$—  [Chemical Formula 4]

in Chemical Formula 4,

R$_{40}$ are each independently halogen, C$_{1-20}$ alkyl, or C$_{1-20}$ haloalkyl, and c is an integer of 2 or more;

D(R$_{41}$)$_3$  [Chemical Formula 5]

in Chemical Formula 5,

D is aluminum or boron, and

R$_{41}$ are each independently hydrogen, halogen, C$_{1-20}$ hydrocarbyl or C$_{1-20}$ hydrocarbyl substituted with halogen,

[L-H]$^+$[Q(E)$_4$]$^-$ or [L]$^+$[Q(E)$_4$]$^-$  [Chemical Formula 6]

in Chemical Formula 6,

L is a neutral or cationic Lewis base;

[L-H]$^+$ is a bronsted acid,

Q is B$^3$ or Al$^{3+}$, and

E are each independently C$_{6-20}$ aryl or C$_{1-20}$ alkyl unsubstituted or substituted with a substituent selected from the group consisting of halogen, C$_{1-20}$ alkyl, C$_{1-20}$ alkoxy, and phenoxy.

The compound represented by Chemical Formula 4 may be alkylaluminoxane such as modified methyl aluminoxane (MMAO), methyl aluminoxane (MAO), ethylaluminoxane, isobutylaluminoxane, butylaluminoxane, and the like.

The alkyl metal compound represented by Chemical Formula 5 may be trimethylaluminum, triethylaluminum, triisobutylaluminum, tripropylaluminum, tributylaluminum, dimethylchloroaluminum, dimethylisobutylaluminum, dimethylethylaluminum, diethylchloroaluminum, triisopropylaluminum, tri-s-butylaluminum, tricyclopentylaluminum, tripentylaluminum, triisopentylaluminum, trihexylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, or the like.

The compound represented by Chemical Formula 6 may be triethylammonium tetraphenylboron, tributylammonium tetraphenylboron, trimethylammonium tetraphenylboron, tripropylammonium tetraphenylboron, trimethylammonium tetra(p-tolyl)boron, tripropylammonium tetra(p-tolyl)boron, triethylammonium tetra(o,p-dimethylphenyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl)aluminum, tributylammonium tetrapentafluorophenylaluminum, N,N-diethylanilinium tetraphenylaluminum, N,N-diethylanilinium tetrapentafluorophenylaluminum, diethylammonium tetrapentafluorophenylaluminum, triphenylphosphonium tetraphenylaluminum, trimethylphosphonium tetraphenylaluminum, triphenylcarbonium tetraphenylboron, triphenylcarbonium tetraphenylaluminum, triphenylcarbonium tetra(p-trifluoromethylphenyl)boron, triphenylcarbonium tetrapentafluorophenylboron, or the like.

The cocatalyst may be supported in an amount of about 5 mmol to about 20 mmol based on 1 g of the support.

In the supported metallocene catalyst according to the present disclosure, a support containing hydroxyl groups on the surface may be used. Preferably, a support containing highly reactive hydroxyl groups and siloxane groups which is dried to remove moisture on the surface may be used.

The support may be silica, silica-alumina, or silica-magnesia dried at a high temperature, and commonly contain oxide, carbonate, sulfate, and nitrate such as Na$_2$O, K$_2$CO$_3$, BaSO$_4$, Mg(NO$_3$)$_2$, and the like.

A drying temperature of the support may preferably be about 200° C. to 800° C., more preferably about 300° C. to 600° C., and most preferably about 300° C. to 400° C. When the drying temperature of the support is less than about 200° C., surface moisture may react with the cocatalyst due to excessive moisture. When it is greater than about 800° C., pores on the surface of the support may be combined to reduce the surface area, and a lot of hydroxyl groups may be lost on the surface and only siloxane groups may remain, thus decreasing the reaction sites with the cocatalyst, which is not preferable.

The amount of the hydroxyl groups on the surface of the support may preferably be about 0.1 mmol/g to 10 mmol/g, more preferably about 0.5 mmol/g to 5 mmol/g. The amount of the hydroxyl groups on the surface of the support may be controlled by the preparation method and conditions of the support, or drying conditions, for example, temperature, time, vacuum, spray drying, or the like.

When the amount of the hydroxyl groups are less than about 0.1 mmol/g, the reaction sites with the cocatalyst may be little, and when it is greater than about 10 mmol/g, there is a possibility of being derived from moisture other than hydroxyl groups on the surface of the support particle, which is not preferable.

In the supported metallocene catalyst of the present disclosure, a weight ratio of total transition metal included in the metallocene catalyst to the support may be about 1:10 to 1:1000. When the support and the metallocene compounds are included within the above weight ratio, an optimal shape may be exhibited. In addition, a weight ratio of the cocatalyst compound to the support may be about 1:1 to 1:100.

The ethylene polymerization reaction may be carried out using a continuous slurry polymerization reactor, a loop slurry reactor, a gas phase reactor, or a solution reactor.

In particular, the polyethylene according to the present disclosure may be prepared by homopolymerizing ethylene in the presence of at least one first metallocene compound represented by the Chemical Formula 1; and at least one second metallocene compound selected from the compounds represented by the Chemical Formula 2.

A weight ratio of the first metallocene compound and the second metallocene compound (first metallocene compound: second metallocene compound) may be about 40:60 to 75:25, or about 42:58 to about 65:35. The weight ratio of the catalyst precursor may be within the above range in terms of implementing a molecular structure having a narrow particle distribution and a low content of ultra-high molecular weight to improve impact strength of PVC compound, and to prepare a chlorinated polyethylene having excellent chlorination productivity and thermal stability.

In addition, the polyethylene may be prepared under the metallocene catalyst as described above while introducing hydrogen gas. Herein, the hydrogen gas may be introduced in an amount of about 30 ppm to about 60 ppm, about 30 ppm to about 45 ppm, or about 30 ppm to about 40 ppm relative to ethylene.

In addition, the polymerization may be performed at a temperature of about 25° C. to about 500° C., preferably about 25° C. to about 200° C., more preferably about 50° C. to about 150° C. In addition, the polymerization may be performed at a pressure of about 1 kgf/cm$^2$ to about 100 kgf/cm$^2$, preferably about 1 kgf/cm$^2$ to about 50 kgf/cm$^2$, more preferably about 5 kgf/cm$^2$ to about 30 kgf/cm$^2$.

In addition, the supported metallocene catalyst may be dissolved or diluted in a C5 to C12 aliphatic hydrocarbon solvent such as pentane, hexane, heptane, nonane, decane and an isomer thereof, in an aromatic hydrocarbon solvent such as toluene and benzene, or in a hydrocarbon solvent substituted with chlorine such as dichloromethane and chlorobenzene, and injected. The solvent used herein is preferably used after removing a small amount of water or air, which acts as a catalyst poison, by treating with a small amount of alkyl aluminum. It is also possible to further use the cocatalyst.

According to another embodiment of the present disclosure, a chlorinated polyethylene (CPE) using the above-described polyethylene is provided.

The chlorinated polyethylene according to the present disclosure may be prepared by polymerizing ethylene in the presence of the supported metallocene catalyst described above, and then reacting the polyethylene with chlorine.

The reaction with chlorine may be carried out by dispersing the prepared polyethylene with water, an emulsifier and a dispersant, and then adding a catalyst and chlorine to react.

As the emulsifier, polyether or polyalkylene oxide may be used. The dispersant may be a polymer salt or an organic acid polymer salt, and the organic acid may be methacrylic acid or acrylic acid.

The catalyst may be a chlorination catalyst used in the art, and benzoyl peroxide may be used. The chlorine may be used alone, or may be mixed with an inert gas and then used.

The chlorination reaction may be performed at about 60° C. to about 150° C., about 70° C. to about 145° C., or about 80° C. to about 140° C. for about 10 minutes to about 10 hours, about 1 hour to about 9 hours, or about 2 hours to about 8 hours.

The chlorinated polyethylene prepared by the above reaction may be further subjected to a neutralization process, a washing process and/or a drying process, and thus may be obtained in a powder form.

The chlorinated polyethylene has excellent uniformity in chlorine distribution and exhibits a high elongation, since the polyethylene maintains a stable crystal structure at a high temperature and has a low content of high-crystalline region. For example, the chlorinated polyethylene may have an elongation of about 1000% or more, or about 1100% or more when measured in accordance with ASTM D-412. In addition, the elongation of the chlorinated polyethylene may be measured under a condition of 500 mm/min. Specifically, the elongation measured under a condition of 500 mm/min in accordance with ASTM D-412 after preparing the chlorinated polyethylene by reacting the polyethylene with chlorine in a slurry (water or aqueous HCl solution) at about 60° C. to about 150° C. may be about 1000% or more. Specifically, the elongation of CPE may be a value measured for the chlorinated polyethylene obtained by heating about 500 kg to about 600 kg of polyethylene in a slurry state (water or aqueous HCl solution) from about 75° C. to about 85° C. to a final temperature of about 120° C. to about 140° C. at a rate of about 15° C./hr to about 18.5° C./hr, and then performing a chlorination reaction with gaseous chlorine at a final temperature of about 120° C. to about 140° C. for about 2 hours to about 5 hours. At this time, the chlorination reaction may be carried out by injecting the gaseous chlorine while raising the temperature and maintaining the pressure in the reactor at about 0.2 MPa to about 0.4 MPa at the same time, and a total amount of chlorine injected is about 550 kg to about 650 kg.

For example, the chlorinated polyethylene may have a chlorine content of about 20 wt % to about 45 wt %, about 31 wt % to about 40 wt %, or about 33 wt % to about 38 wt %. The chlorine content of the chlorinated polyethylene may be measured using combustion ion chromatography. For example, the combustion ion chromatography uses a combustion IC (ICS-5000/AQF-2100H) device equipped with an IonPac AS18 (4×250 mm) column. And the chlorine content may be measured using KOH (30.5 mM) as an eluent at a flow rate of 1 mL/min at an inlet temperature of 900° C. and an outlet temperature of 1000° C. The device conditions and measurement conditions for measuring the chlorine content are as described in Test Example 2 to be described later, the detailed description is omitted.

The chlorinated polyethylene may be, for example, a randomly chlorinated polyethylene.

The chlorinated polyethylene prepared according to the present disclosure is excellent in chemical resistance, weather resistance, flame retardancy, processability and impact strength reinforcing effect, and is widely used as an impact reinforcing agent for PVC pipes and window profiles.

In addition, the chlorinated polyethylene according to the present disclosure may produce a PVC molded product by conventional methods in the art. For example, the molded product may be manufactured by roll-milling the chlorinated polyethylene and extruding it.

Hereinafter, preferred examples are provided to aid in understanding the present invention. However, these examples are for illustrative purposes only, and the invention is not intended to be limited by these examples.

[Preparation of Catalyst Precursor]

Synthesis Example 1: Preparation of First Metallocene Compound

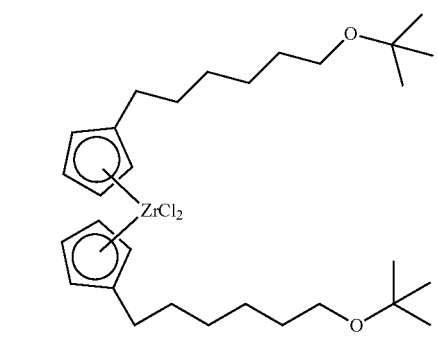

t-Butyl-O—(CH$_2$)$_6$—Cl was prepared by the method shown in Tetrahedron Lett. 2951 (1988) using 6-chlorohexanol, and reacted with cyclopentadienyl sodium (sodium Cp salt, NaCp) to obtain t-butyl-O—(CH$_2$)$_6$—C$_5$H$_5$ (yield 60%, b.p. 80° C./0.1 mmHg).

Further, t-butyl-O—(CH$_2$)$_6$—C$_5$H$_5$ was dissolved in THF at −78° C., and n-BuLi was slowly added thereto. Thereafter, it was heated to room temperature and reacted for 8 hours. The lithium salt solution synthesized as described above was slowly added to a suspension solution of ZrCl$_4$(THF)$_2$ (170 g, 4.50 mmol)/THF (30 mL) at −78° C., and further reacted for about 6 hours at room temperature. All volatiles were dried in vacuum and the resulting oily liquid material was filtered by adding a hexane solvent. The filtered solution was dried in vacuum, and hexane was added to obtain a precipitate at a low temperature (−20° C.). The obtained precipitate was filtered at a low temperature to obtain [tBu-O—(CH$_2$)$_6$—C$_5$H$_4$]$_2$ZrCl$_2$ in the form of a white solid (yield 92%).

$^1$H-NMR (300 MHz, CDCl$_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

$^{13}$C-NMR (CDCl$_3$): 135.09, 116.66, 112.28, 72.42, 61.52, 30.66, 30.31, 30.14, 29.18, 27.58, 26.00.

Synthesis Example 2: Preparation of Second Metallocene Compound

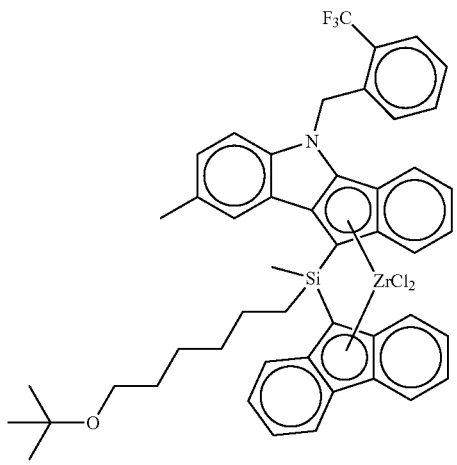

2-1 Preparation of Ligand Compound 2.9 g (7.4 mmol) of 8-methyl-5-(2-(trifluoromethyl)benzyl)-5,10-dihydroindeno[1,2-b]indole was dissolved in 100 mL of hexane and 2 mL (16.8 mmol) of MTBE (methyl tertialry butyl ether), and 3.2 mL (8.1 mmol) of 2.5 M n-BuLi hexane solution was added dropwise in a dryice/acetone bath and stirred overnight at room temperature. In another 250 mL schlenk flask, 2 g (7.4 mmol) of (6-tert-butoxyhexyl)dichloro(methyl)silane was dissolved in 50 mL of hexane and added dropwise in a dryice/acetone bath. Then, a lithiated slurry of 8-methyl-5-(2-(trifluoromethyl) benzyl)-5,10-dihydroindeno[1,2-b]indole was added dropwise through a cannula. After the injection, the mixture was slowly heated to room temperature and then stirred at room temperature overnight. At the same time, 1.2 g (7.4 mmol) of fluorene was also dissolved in 100 mL of tetrahydrofuran (THF), and 3.2 mL (8.1 mmol) of 2.5 M n-BuLi hexane solution was added dropwise in a dryice/acetone bath, followed by stirring at room temperature overnight.

The reaction solution (Si solution) of 8-methyl-5-(2-(trifluoromethyl)benzyl)-5,10-dihydroindeno[1,2-b]indole and (6-(tert-butoxy)hexyl)dichloro(methyl)silane was confirmed by NMR sampling.

$^1$H NMR (500 MHz, CDCl$_3$): 7.74-6.49 (11H, m), 5.87 (2H, s), 4.05 (1H, d), 3.32 (2H, m), 3.49 (3H, s), 1.50-1.25 (8H, m), 1.15 (9H, s), 0.50 (2H, m), 0.17 (3H, d).

After confirming the synthesis, the lithiated solution of fluorene was slowly added dropwise to the Si solution in a dryice/acetone bath and stirred overnight at room temperature. After the reaction, it was extracted with ether/water and residual moisture of the organic layer was removed with MgSO$_4$. Then, the solvent was removed under vacuum reduced pressure to obtain 5.5 g (7.4 mmol) of an oily ligand compound, which was confirmed by 1H-NMR.

$^1$H NMR (500 MHz, CDCl$_3$): 7.89-6.53 (19H, m), 5.82 (2H, s), 4.26 (1H, d), 4.14-4.10 (1H, m), 3.19 (3H, s), 2.40 (3H, m), 1.35-1.21 (6H, m), 1.14 (9H, s), 0.97-0.9 (4H, m), −0.34 (3H, t).

2-2 Preparation of Metallocene Compound 5.4 g (Mw 742.00, 7.4 mmol) of the ligand compound synthesized in the above 2-1 was dissolved in 80 mL of toluene and 3 mL (25.2 mmol) of MTBE, and 7.1 mL (17.8 mmol) of 2.5 M n-BuLi hexane solution was added dropwise in a dryice/acetone bath, followed by stirring at room temperature overnight. 3.0 g (8.0 mmol) of ZrCl$_4$(THF)$_2$ was added to 80 mL of toluene to prepare a slurry. 80 mL of the toluene slurry of ZrCl$_4$(THF)$_2$ was transferred to a ligand-Li solution in a dry ice/acetone bath and stirred at room temperature overnight.

After the reaction mixture was filtered to remove LiCl, the toluene of the filtrate was removed by vacuum drying, and then 100 mL of hexane was added thereto, followed by sonication for 1 hour. This was filtered to obtain 3.5 g (yield 52 mol %) of a purple metallocene compound as a filtered solid.

$^1$H NMR (500 MHz, CDCl$_3$): 7.90-6.69 (9H, m), 5.67 (2H, s), 3.37 (2H, m), 2.56 (3H, s), 2.13-1.51 (11H, m), 1.17 (9H, s).

Synthesis Example 3: Preparation of Second Metallocene Compound

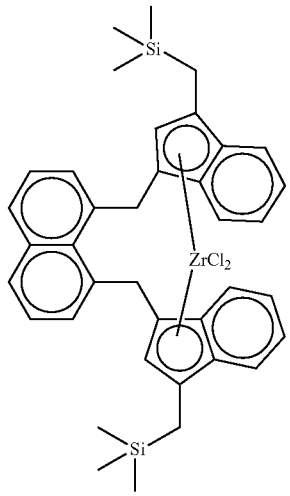

3-1 Preparation of Ligand Compound 6.3 g (20 mmol) of 1,8-bis(bromomethyl)naphthalene and 8.3 g (40 mmol) of methyl TMS-indene lithium salt were each dissolved in 80 mL of THF, and then added dropwise in a dry ice/acetone bath, followed by stirring at room temperature overnight. After completion of the stirring, the reaction product was extracted with ether/water and residual moisture of the organic layer was removed with $MgSO_4$. Then, the solvent was removed under vacuum reduced pressure to obtain 11.1 g (20 mmol, Mw 556.93 g/mol) of a liquid ligand compound.

3-2 Preparation of Metallocene Compound 11 g of the ligand compound synthesized in 3-1 was dissolved in a mixed solvent of 80 mL of toluene and 5 mL of methyl tertiary butyl ether (MTBE), and 16.7 mL (41.6 mmol) of a hexane solution of 2.5 M n-butyl lithium was added dropwise, followed by stirring at room temperature. 7.5 g (19.8 mmol) of $ZrCl_4(THF)_2$ was added to 80 mL of toluene to prepare a slurry, and the slurry was transferred to a dry ice/acetone bath, followed by stirring at room temperature overnight.

After completion of the stirring, the slurry was filtered to remove LiCl, the toluene of the filtrate was removed by vacuum drying, and then 100 mL of hexane was added thereto, followed by sonication for 1 hour. Thereafter, the slurry was filtered to obtain 4.5 g (yield 62.3 mol %, yellow solid) of a metallocene compound as a filtered solid.

$^1$H NMR (500 MHz, $CDCl_3$): 8.16-6.95 (14H, m), 5.99 (2H, d), 3.99 (2H, m), 3.83 (2H, m), 3.39 (2H, m), 0.15 (18H, d).

Synthesis Example 4: Preparation of Second Metallocene Compound

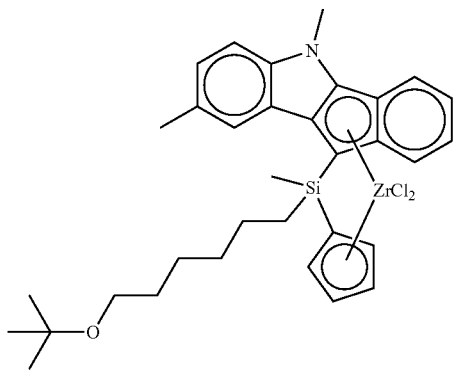

4-1 Preparation of Ligand Compound 3 g (10 mmol) of indenoindole derivative was dissolved in 100 mL of hexane, and 4.4 mL (11 mmol) of 2.5M n-BuLi hexane solution was added dropwise thereto, followed by stirring overnight at room temperature. Another 250 mL schlenk flask was prepared and placed in a glove box. Then, 2.7 g (10 mmol) of (6-tert-butoxyhexyl)dichloro(methyl) silane was weighed and taken out in a glove box, dissolved in 50 mL of hexane, and then lithiated slurry was added dropwise thetero. The mixture was slowly heated to room temperature and stirred overnight. 10 mmol of sodium Cp salt was dissolved in 100 mL of THF, and then added dropwise to the mixture, followed by stirring at room temperature overnight. After the reaction, the residual moisture in the organic layer was removed by extraction with $MgSO_4$, and the solvent was removed under vacuum-reduced pressure to obtain a ligand compound in an oilic state. This was confirmed by $^1$H NMR.

4-2 Preparation of Metallocene Compound 7.9 mmol of the ligand compound synthesized in 4-1 was dissolved in 80 mL of toluene, and 6.6 mL (16.6 mmol) of 2.5M nBuLi hexane solution was added dropwise thereto, followed by stirring at room temperature overnight. 7.9 mmol of $ZrCl_4(THF)_2$ was prepared as a slurry in 80 mL of toluene, and the ligand-Li solution was transferred and stirred.

The reaction mixture was filtered to remove LiCl, and toluene of the filtrate was vacuum dried to obtain 1.5 g of a liquid catalyst with a yield of 23 mol %.

[Preparation of Supported Catalyst]

Preparation Example 1: Preparation of Supported Catalyst 5.0 kg of toluene solution was added to a 20 L stainless steel (sus) high pressure reactor, and the reactor temperature was maintained at 40° C. After adding 1000 g of silica (SP948, manufactured by Grace Davison Co.) dehydrated at a temperature of 600° C. for 12 hours under vacuum to the reactor and dispersing the silica sufficiently, 84 g of the metallocene compound of Synthesis Example 1 was dissolved in toluene, added thereto and then reacted while stirring at 200 rpm at 40° C. for 2 hours. Thereafter, the stirring was stopped, followed by settling for 30 minutes and then decantation of the reaction solution.

2.5 kg of toluene was added to the reactor, and 9.4 kg of 10 wt % methylaluminoxane (MAO)/toluene solution was added thereto, followed by stirring at 200 rpm at 40° C. for 12 hours. Thereafter, the stirring was stopped, followed by settling for 30 minutes and then decantation of the reaction solution. After 3.0 kg of toluene was added and stirred for 10 minutes, the stirring was stopped, followed by settling for 30 minutes and then decantation of the toluene solution.

After 3.0 kg of toluene was added to the reactor, 116 g of the metallocene compound of Synthesis Example 2 was dissolved in 1 L of the toluene solution, and added thereto, followed by stirring at 200 rpm at 40° C. for 2 hours. At this time, a weight ratio of the metallocene compound of Synthesis Example 1 and the metallocene compound of Synthesis Example 2 was 42:58. After lowering the reactor temperature to room temperature, the stirring was stopped, followed by settling for 30 minutes and then decantation of the reaction solution.

2.0 kg of toluene was added to the reactor and stirred for 10 minutes. Then, the stirring was stopped, followed by settling for 30 minutes and then decantation of the reaction solution.

3.0 kg of hexane was added to the reactor, the hexane slurry was transferred to a filter drier, and the hexane solution was filtered. 1 kg-$SiO_2$ supported hybrid catalyst was prepared by drying under reduced pressure at 40° C. for 4 hours.

Comparative Preparation Example 1: Preparation of Supported Catalyst

A supported hybrid catalyst was prepared in the same manner as in Preparation Example 1, except that the metallocene compound of Synthesis Example 3 was used instead of the metallocene compound of Synthesis Example 2.

Comparative Preparation Example 2: Preparation of Supported Catalyst

A supported hybrid catalyst was prepared in the same manner as in Preparation Example 1, except that the metallocene compound of Synthesis Example 4 was used instead of the metallocene compound of Synthesis Example 2.

[Preparation of Polyethylene]

Example 1-1

The supported catalyst prepared in Preparation Example 1 was added to a single slurry polymerization process to prepare a high density polyethylene.

First, a 100 m³ reactor was charged with a flow rate of 25 ton/hr of hexane, 10 ton/hr of ethylene, 30 ppm of hydrogen (relative to ethylene), and 10 kg/hr of triethylaluminum (TEAL), and a supported hybrid metallocene catalyst of Preparation Example 1 was injected to the reactor at 0.5 kg/hr. Thereafter, the ethylene was continuously reacted in a hexane slurry state at a reactor temperature of 82° C. and a pressure of 7.0 kg/cm² to 7.5 kg/cm². Then, it was subjected to solvent removal and drying to prepare a high density polyethylene in a powder form.

Example 1-2

A high density polyethylene having a powder form was prepared in the same manner as in Example 1-1, except that the input amount of hydrogen was changed to 40 ppm.

Example 1-3

A high density polyethylene having a powder form was prepared in the same manner as in Example 1-1, except that the input amount of hydrogen was changed to 35 ppm.

Comparative Example 1-1

A high density polyethylene (HDPE) commercial product (CE604K, manufactured by LG Chem), which is prepared using a Ziegler-Natta (Z/N) catalyst and has a melt index (MI$_5$, 190° C., 5 kg) of 0.45 g/10 min, was prepared for Comparative Example 1-1.

Comparative Example 1-2

A high density polyethylene having a powder form was prepared in the same manner as in Example 1-2, except that the supported catalyst prepared in Comparative Preparation Example 1 was used instead of the supported catalyst prepared in Preparation Example 1.

Comparative Example 1-3

A high density polyethylene having a powder form was prepared in the same manner as in Comparative Example 1-2, except that the input amount of hydrogen was changed to 70 ppm.

Comparative Example 1-4

A high density polyethylene having a powder form was prepared in the same manner as in Comparative Example 1-2, except that the input amount of hydrogen was changed to 50 ppm.

Comparative Example 1-5

A high density polyethylene having a powder form was prepared in the same manner as in Example 1-1, except that the supported catalyst prepared in Comparative Preparation Example 2 was used instead of the supported catalyst prepared in Preparation Example 1.

Test Example 1

Physical properties of the polyethylenes prepared in Examples and Comparative Examples were measured by the following method, and the results are shown in Table 1 below.

1) Melt Index (MI, g/10 min)

The melt index ($MI_{2.16}$, $MI_5$, $MI_{21.6}$) was measured under a load of 5 kg, and 21.6 kg, respectively, in accordance with ASTM D 1238 at a temperature of 190° C. A weight (g) of polymer melted for 10 minutes was recorded as the melt index.

2) Melt Flow Rate Ratio (MFRR, $MI_{21.6/5}$)

The melt flow rate ratio (MFRR, $MI_{21.6/5}$) was obtained by dividing the melt index measured at 190° C. under a load of 21.6 kg by the melt index measured at 190° C. under a load of 5 kg in accordance with ASTM D 1238.

3) Density

The density (g/cm³) was measured in accordance with ASTM D 1505.

4) High-Crystalline Region Ratio (%)

A temperature rising elution fractionation (TREF) graph for polyethylene was obtained, and an elution temperature, which is a splitting point (minimum value) between two highest peaks among the peaks appearing on the TREF graph, was used as a reference for the vertical axis at which the high-crystalline region starts. Then, a graph area of the high-crystalline region having a temperature equal to or higher than the elution temperature of the minimum value was measured, and a percentage value obtained by dividing the graph area by a total graph area was expressed as the high-crystalline region ratio (%). The temperature rising elution fractionation (TREF) graph for polyethylene was obtained using Agilent Technologies 7890A manufactured by PolymerChar. Specifically, a sample was dissolved in 20 mL of 1,2,4-trichlorobenzene at a concentration of 1.5 mg/mL, then dissolved by increasing the temperature at a rate of 40° C./min from 30° C. to 150° C., then recrystallized by lowering the temperature at a rate of 0.5° C./min to 35° C., and then eluted by increasing the temperature at a rate of 1° C./min to 140° C. to obtain the graph.

5) Alpha Transition Temperature (° C.)

The alpha transition temperature was measured by lowering the temperature to −60° C., maintaining at that temperature for 5 minutes, increasing the temperature to 140° C., and then determining the top of the tan δ curve as the alpha transition temperature using dynamic mechanical analyzer (DMA).

TABLE 1

| | Examples | | | | Comparative Examples | | | |
|---|---|---|---|---|---|---|---|---|
| | | | | | 1-2 | 1-3 | 1-4 | 1-5 |
| Catalyst | 1-1 Prep. Ex. 1 | 1-2 Prep. Ex. 1 | 1-3 Prep. Ex. 1 | 1-1 Z/N | Comp. Prep. Ex. 1 | Comp. Prep. Ex. 1 | Comp. Prep. Ex. 1 | Comp. Prep. Ex. 2 |
| Input amount of $H_2$ during polymerization (ppm) | 30 | 40 | 35 | — | 40 | 70 | 50 | 30 |
| $MI_5$ (5 kg, 190° C., g/10 min) | 0.23 | 0.27 | 0.26 | 0.45 | 0.75 | 1.62 | 0.98 | 2.30 |
| MFRR (21.6/5) | 12.9 | 13.6 | 13.4 | 11.0 | 10.5 | 8.5 | 9.9 | 4.2 |
| Density (g/cm$^3$) | 0.949 | 0.949 | 0.950 | 0.951 | 0.951 | 0.951 | 0.950 | 0.948 |
| High-crystalline region ratio (%) | 11.3 | 10.3 | 11.8 | 13.8 | 9.7 | 9.7 | 9.2 | 14.7 |
| Alpha transition temp. (° C.) | >120 | >120 | >120 | >120 | 108.2 | 109.5 | 110.9 | 112.4 |

In Table 1, the input amount (ppm) of $H_2$ during polymerization is a hydrogen gas content based on the input amount of ethylene.

As shown in Table 1, it was confirmed that Examples showed the high alpha transition temperature of about 125° C. to about 145° C., which is higher than 120° C., and the low high-crystalline region ratio of 11.8% or less, in contrast to Comparative Examples.

Test Example 2

Chlorinated polyethylenes were prepared using the polyethylenes prepared in Examples and Comparative Examples.

[Preparation of Chlorinated Polyethylene]

5000 L of water and 550 kg of high density polyethylene prepared in Example 1-1 were added to a reactor, followed by sodium polymethacrylate as a dispersant, oxypropylene and oxyethylene copolyether as an emulsifier, and benzoyl peroxide as a catalyst. Then, the temperature was raised from 80° C. to 132° C. at a rate of 17.3° C./hr and chlorination was carried out by injecting gaseous chlorine at a final temperature of 132° C. for 3 hours. At this time, the gaseous chlorine was injected while simultaneously raising the temperature and maintaining the reactor pressure at 0.3 MPa, and a total input of chlorine was 610 kg. The chlorinated reactant was neutralized with NaOH for 4 hours, washed again with running water for 4 hours, and finally dried at 120° C. to prepare a chlorinated polyethylene in a powder form.

In addition, chlorinated polyethylenes having a powder form were also prepared in the same manner as described above, using the polyethylenes prepared in Examples 1-2 to 1-3 and Comparative Examples 1-1 to 1-5.

As described above, physical properties of the chlorinated polyethylenes of Examples 2-1 to 2-3 and Comparative Examples 2-1 to 2-5 prepared using the polyethylenes of Examples 1-1 to 1-3 and Comparative Examples 1-1 to 1-5 were measured by the following method, and the results are shown in Table 2 below.

1) Elongation of CPE (%)

The elongation of CPE was measured under a condition of 500 mm/min in accordance with ASTM D-2240.

2) Deoxidation Time (Min) of CPE

A deoxidation process was performed by adding water until the pH of the solution reached 6.0 or higher in the preparation of chlorinated polyethylene, and the time taken until the pH of the solution became 6.0 or higher was measured as the deoxidation time. At this time, the deoxidation time of CPE is preferably 550 minutes or less. When it is longer than 550 minutes, the entire chlorination process is delayed, which may cause a problem that the CPE productivity decreases.

TABLE 2

| | Examples | | | Comparative Examples | | | | |
|---|---|---|---|---|---|---|---|---|
| | 2-1 | 2-2 | 2-3 | 2-1 | 2-2 | 2-3 | 2-4 | 2-5 |
| Elongation of CPE (%) | 1240 | 1370 | 1123 | 1100 | 1398 | 1400 | 1400 | 861 |
| Deoxidation time (min) | 390 | 535 | 388 | 431 | 605 | 600 | 600 | — |

As shown in Table 2, it was confirmed that Examples were not only excellent in CPE productivity due to the significantly reduced deoxidation time, but also very effective in improving impact strength during the preparation of PVC compound by achieving a high elongation of more than 1123% after chlorination in contrast to Comparative Examples.

The invention claimed is:

1. A polyethylene having an alpha transition temperature of 120° C. or more, and
   a crystalline region ratio on a temperature rising elution fractionation (TREF) graph of 12.5% or less, wherein the crystalline region ratio is obtained by dividing a graph area of a crystalline region having an elution temperature or more by a total graph area in percentage, wherein the elution temperature is a splitting point corresponding to a smallest peak between two highest peaks,
   wherein the polyethylene is an ethylene homopolymer.

2. The polyethylene according to claim 1, wherein the polyethylene has the alpha transition temperature of 120° C. to 145° C.

3. The polyethylene according to claim 1, wherein the polyethylene has the crystalline region ratio on a temperature rising elution fractionation (TREF) graph of 5% to 12.5%.

4. The polyethylene according to claim 1, wherein the polyethylene has a melt index (MI5) of 0.1 g/10 min to 1.5 g/10 min.

5. The polyethylene according to claim 1, wherein the polyethylene has a melt flow rate ratio (MFRR21.6/5, a value obtained by dividing the melt index measured at 190° C. under a load of 21.6 kg by the melt index measured at 190° C. under a load of 5 kg in accordance with ASTM D 1238) of 10 to 20.

6. The polyethylene according to claim 1, wherein the polyethylene has a density of 0.947 g/cm³ to 0.957 g/cm³.

7. The polyethylene according to claim 1, wherein the polyethylene has a molecular weight distribution (Mw/Mn) of 2 to 10.

8. A method for preparing the polyethylene according to claim 1, comprising the step of polymerizing ethylene in the presence of at least one first metallocene compound represented by Chemical Formula 1; and at least one second metallocene compound represented by Chemical Formula 2:

[Chemical Formula 1]

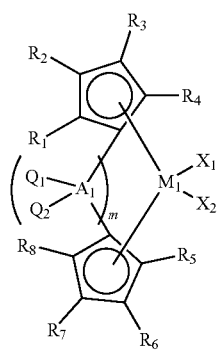

in Chemical Formula 1, at least one of $R_1$ to $R_8$ is —$(CH_2)_n$—OR, wherein R is C1-6 linear or branched alkyl and n is an integer of 2 to 6;

the rest of $R_1$ to $R_8$ if present are the same as or different from each other, and are each independently selected from the group consisting of hydrogen, halogen, C1-20 alkyl, C2-20 alkenyl, C6-20 aryl, C7-40 alkylaryl, and C7-40 arylalkyl, or two or more of R1 to R8 that are adjacent to each other are connected with each other to form a C6-20 aliphatic or aromatic ring unsubstituted or substituted with a C1-10 hydrocarbyl group;

$Q_1$ and $Q_2$ are the same as or different from each other, and are each independently hydrogen, halogen, C1-20 alkyl, C2-20 alkenyl, C2-20 alkoxyalkyl, C6-20 aryl, C7-40 alkylaryl, or C7-40 arylalkyl;

$A_1$ is carbon, silicon, or germanium;

$M_1$ is a Group 4 transition metal;

$X_1$ and $X_2$ are the same as or different from each other, and are each independently halogen, C1-20 alkyl, C2-20 alkenyl, C6-20 aryl, a nitro group, an amido group, C1-20 alkylsilyl, C1-20 alkoxy, or a C1-20 sulfonate group; and m is an integer of 0 or 1,

[Chemical Formula 2]

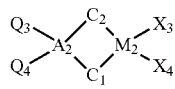

in Chemical Formula 2, $Q_3$ and $Q_4$ are the same as or different from each other, and are each independently hydrogen, halogen, C1-20 alkyl, C2-20 alkenyl, C2-20 alkoxyalkyl, C6-20 aryl, C7-40 alkylaryl, or C7-40 arylalkyl;

$A_2$ is carbon, silicon, or germanium;

$M_2$ is a Group 4 transition metal;

$X_3$ and $X_4$ are the same as or different from each other, and are each independently halogen, $C_{1-20}$ alkyl, $C_{2-20}$ alkenyl, $C_{6-20}$ aryl, a nitro group, an amido group, $C_{1-20}$ alkylsilyl, $C_{1-20}$ alkoxy, or a $C_{1-20}$ sulfonate group; and one of $C_1$ or $C_2$ is represented by Chemical Formula 3a, and the other is represented by Chemical Formula 3c, 3d or 3e:

[Chemical Formula 3a]

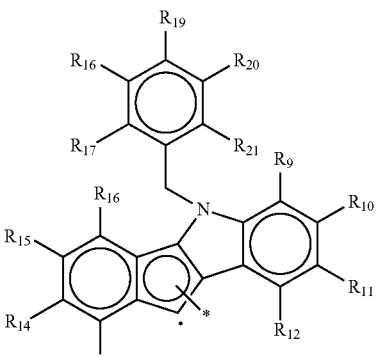

[Chemical Formula 3c]

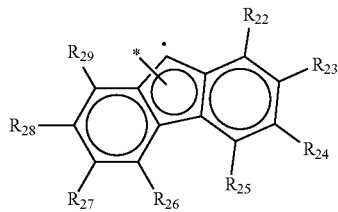

[Chemical Formula 3d]

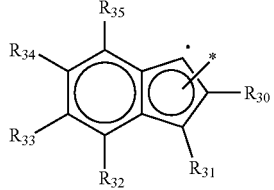

[Chemical Formula 3e]

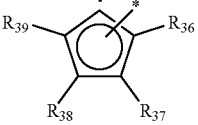

in Chemical Formulae 3a, 3c, 3d and 3e, $R_9$ to $R_{39}$ are the same as or different from each other, and are each independently hydrogen, halogen, $C_{1-20}$ alkyl, $C_{1-20}$haloalkyl, $C_{2-20}$ alkenyl, $C_{1-20}$ alkylsilyl, $C_{1-20}$ silylalkyl, $C_{1-20}$ alkoxysilyl, $C_{1-20}$alkoxy, $C_{6-20}$ aryl, $C_{7-40}$ alkylaryl, or $C_{7-40}$ arylalkyl, provided that at least one of $R_{17}$ to $R_{21}$ is $C_{1-20}$haloalkyl, or two or more of $R_{22}$ to $R_{39}$ that are adjacent to each other are connected with each other to form a C6-20 aliphatic or aromatic ring unsubstituted or substituted with a C1-10 hydrocarbyl group;

• represents a site of binding to $A_1$; and

* represents a site of binding to $M_1$.

9. The method for preparing the polyethylene according to claim 8, wherein the first metallocene compound is represented by Chemical Formulae 1-1 or 1-2:

[Chemical Formula 1-1]

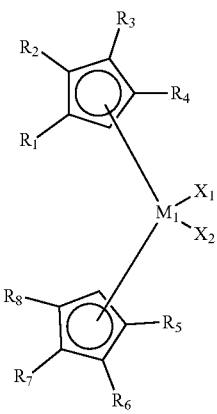

[Chemical Formula 1-2]

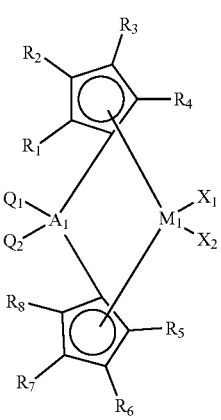

in Chemical Formulae 1-1 to 1-2, $Q_1$ and $Q_2$ are each independently $C_{1-3}$ alkyl; $X_1$ and $X_2$ are each independently halogen; $A_1$ is silicon; $M_1$ is zirconium or hafnium; $R_1$, $R_2$, $R_4$, $R_5$, $R_7$, and $R_8$ are each hydrogen; and $R_3$ and $R_6$ are each independently $C_{2-6}$ alkyl substituted with $C_{1-6}$ alkoxy.

10. The method for preparing the polyethylene according to claim 8, wherein $R_3$ and $R_6$ are each independently unsubstituted C1-6 alkyl or C2-6 alkyl substituted with C1-6 alkoxy.

11. The method for preparing the polyethylene according to claim 8, wherein the second metallocene compound is represented by Chemical Formula 2-1:

[CHemical Formula 2-1]

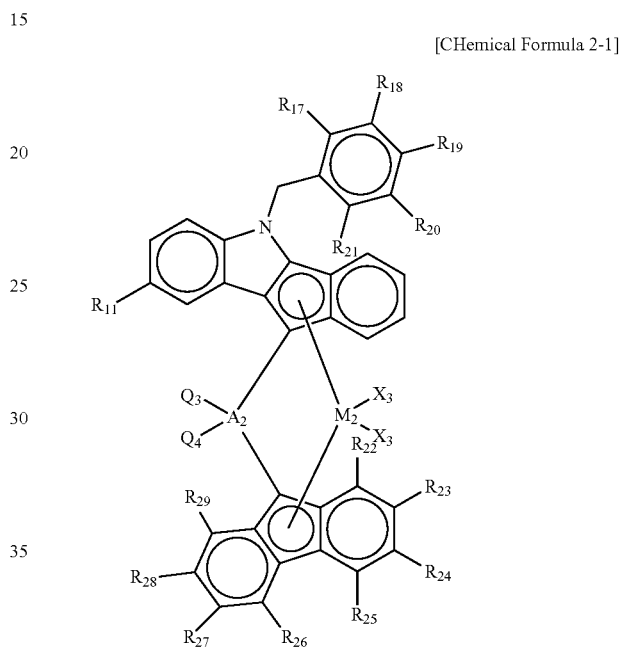

in Chemical Formula 2-1, $Q_3$, $Q_4$, $A_2$, $M_2$, $X_3$, $X_4$, $R_{11}$, and $R_{17}$ to $R_{29}$ are the same as defined in Chemical Formula 2.

12. The method for preparing the polyethylene according to claim 8, wherein $R_{17}$ to $R_{21}$ are each independently hydrogen, or C1-6 haloalkyl, provided that at least one of $R_{17}$ to $R_{21}$ is C1-6 haloalkyl.

13. The method for preparing the polyethylene according to claim 8, wherein a weight ratio of the first metallocene compound and the second metallocene compound is 40:60 to 75:25.

14. The method for preparing the polyethylene according to claim 8, wherein the polymerization is carried out while introducing 30 ppm to 60 ppm of hydrogen gas based on ethylene content.

15. The method for preparing the polyethylene according to claim 8, wherein the first metallocene compound is represented by Chemical Formulae 1-3 or 1-4:

[Chemical Formula 1-3]

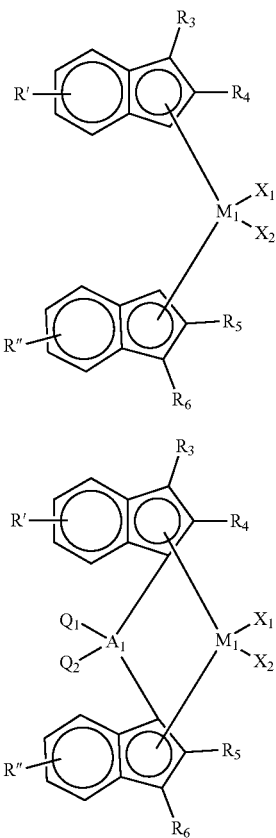

[Chemical Formula 1-4]

in Chemical Formulae 1-3 to 1-4, $Q_1$, $Q_2$, $A_1$, $M_1$, $X_1$, $X_2$, and $R_3$ to $R_6$ are the same as defined in Chemical Formula 1, and R' and R" are the same as or different from each other, and are each independently a C1-10 hydrocarbyl group.

16. The method for preparing the polyethylene according to claim 8, wherein the second metallocene compound is represented by the following Chemical Formula:

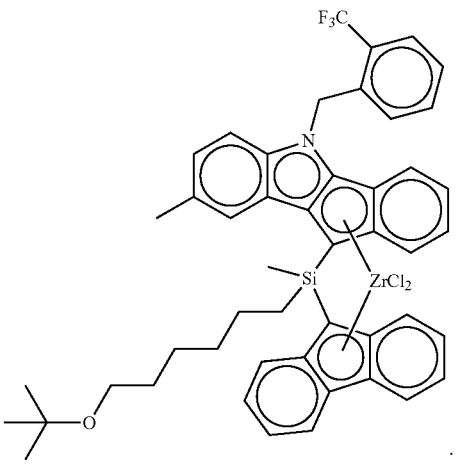

17. A chlorinated polyethylene prepared by reacting the polyethylene according to claim 1 with chlorine.

18. The chlorinated polyethylene according to claim 17, wherein the chlorinated polyethylene has an elongation of 1000% or more when measured in accordance with ASTM D-412.

19. The chlorinated polyethylene according to claim 17, wherein the chlorinated polyethylene has a chlorine content of about 20 wt % to about 45 wt %.

* * * * *